M. MURPHY.
BAFFLE PLATE DEVICE FOR ELECTRIC FIRELESS COOKERS.
APPLICATION FILED FEB. 26, 1920.
1,346,666.
Patented July 13, 1920.
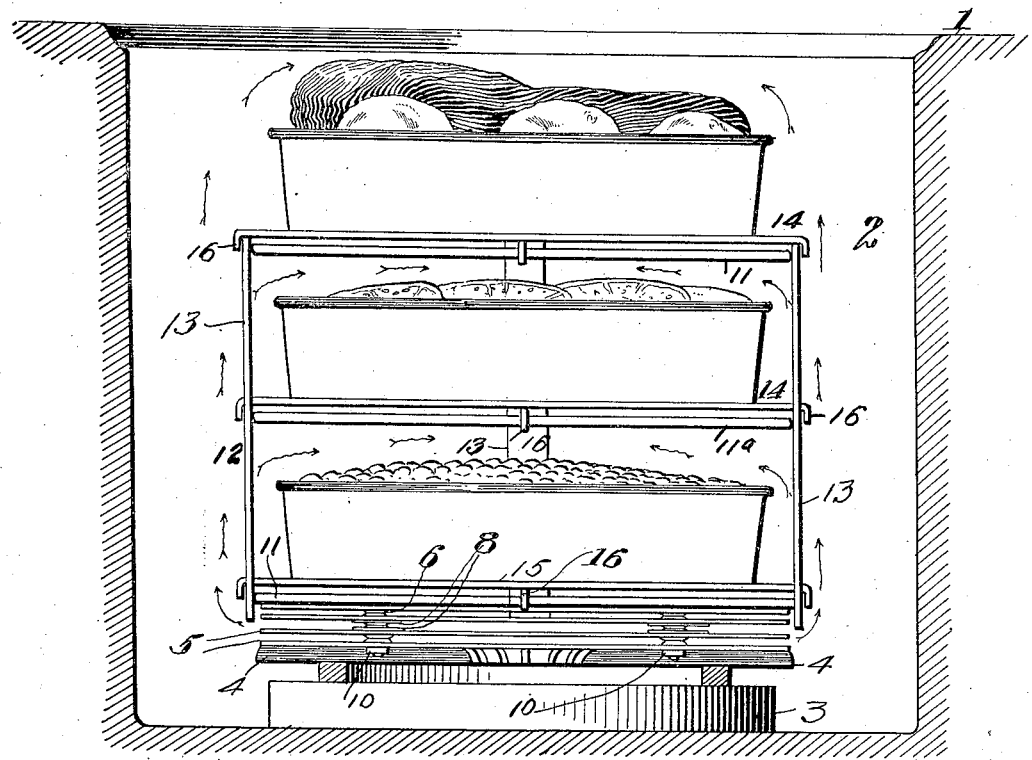
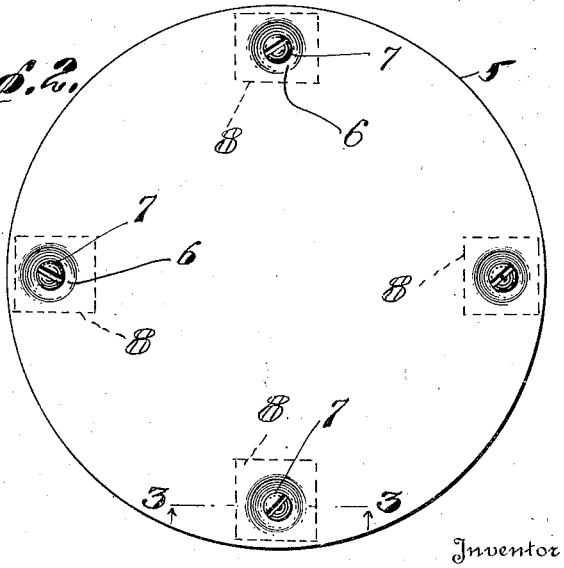
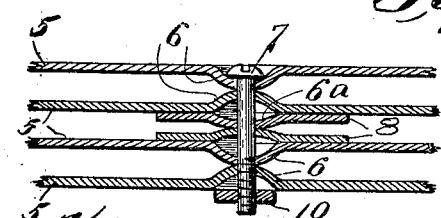
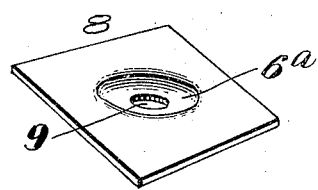
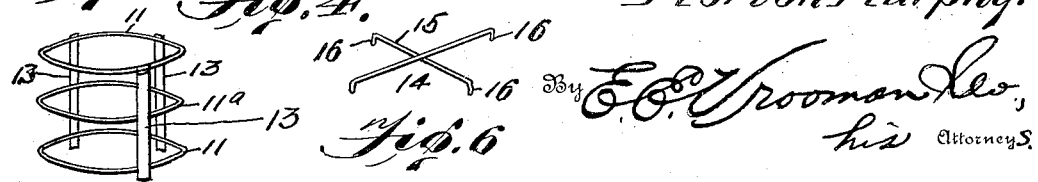
Inventor
Morton Murphy.

UNITED STATES PATENT OFFICE.

MORTON MURPHY, OF MARION, INDIANA.

BAFFLE-PLATE DEVICE FOR ELECTRIC FIRELESS COOKERS.

1,346,666.   Specification of Letters Patent.   Patented July 13, 1920.

Application filed February 26, 1920. Serial No. 361,592.

*To all whom it may concern:*

Be it known that I, MORTON MURPHY, a citizen of the United States, residing at Marion, in the county of Grant and State of Indiana, have invented certain new and useful Improvements in Baffle-Plate Devices for Electric Fireless Cookers, of which the following is a specification, reference being had therein to the accompanying drawings.

This invention relates to electrical fireless cookers, and more particularly to a baffle plate device for electrical fireless cookers.

The object of the invention is the construction of a simple and efficient device that will cause food in the oven of a fireless cooker, to be not only thoroughly cooked, but with such food as pies, cakes, biscuits and meat, to be browned satisfactorily on the top.

Another object of the invention is the construction of a device which will retard the heat from the bottom, forcing it around the edges over the top of the containers in which the food is placed, thereby resulting in the top of the food being excellently browned or thoroughly cooked, at the same time the bottom and central part of the food is cooked.

With these and other objects in view, my invention comprises certain novel combinations, constructions and arrangements of parts as will be hereinafter described, illustrated in the accompanying drawings, and more particularly pointed out in the appended claims.

In the drawings:

Figure 1 is a fragmentary sectional view of an electric fireless cooker, showing the oven thereof, and in the oven is shown in side elevation my improved device.

Fig. 2 is a top plan view of a baffle plate device.

Fig. 3 is an enlarged sectional view, taken on line 3—3, Fig. 2, and looking in the direction of the arrows.

Fig. 4 is a perspective view of one of the auxiliary disks or plates.

Fig. 5 is a perspective view of the baking rack.

Fig. 6 is a perspective view of the shelf device.

Referring to the drawings by numerals, 1 designates the stove, and 2 the oven thereof. A heating element 3 is placed in the bottom of the oven, and grate 4 is placed upon the heating element 3.

The baffle plate device comprises, preferably, a plurality of primary metal disks 5, which disks have, preferably, four inwardly-punched or pressed projections 6. These projections 6 are provided with registering apertures, through which bolts 7 extend. The projections 6 (Fig. 3) on the two inner disks extending outwardly abut against projections 6 on the outer disks, which depressions on the outer disks are positioned inwardly; therefore, the projections 6 on the outer disks and the inner disks constitute spacing means.

To space the two contiguous inner disks, I provide auxiliary disks 8, which auxiliary disks are likewise provided with projections, or inwardly-extending stamped portions $6^a$, and these portions are provided with apertures 9, through which the bolts 7 extend; these central auxiliary disks 8 uniformly space the two inner disks 5, the same as the projections 6 space the two contiguous outer disks. Nuts 10 are threaded upon the bolts for securely fastening the spaced disks of the baffle plate device in an assembled position.

By this peculiar assembling of a plurality of disks together in spaced relation, a suitable air space is formed between each two contiguous disks, allowing heat to pass out and upward, retarding the heat from too greatly heating the bottom of the receptacle containing the food but causing the heat to be distributed more uniformly above the receptacle, or receptacles, resulting in the even and uniform browning of the food in the receptacle, or receptacles.

The baffle plate device is placed directly upon the grate 4 (Fig. 1), and the lower ring 11 of the baking rack 12 rests directly upon the top disks of the baffle plate device. I preferably employ 3 rings 11 and $11^a$ in the construction of my rack, and these rings are secured in spaced relation by means of, preferably, three standards 13; these standards 13 are not placed at an equal distance around all the rings but closer together at one side of the device, so to speak, leaving the opposite side "open" so that the shelf device 14, as well as the receptacle, containing the food can be quickly placed upon the baking rack, or removed laterally therefrom.

The shelf device comprises preferably a pair of straight members 15; the ends of each member 15 extend downwardly, as at 16, to prevent displacement of the shelf device 14 from off the rack 12.

I have found, from practical experience, that my baffle plate device produces an excellent result when it is desired to brown food. Of course, it will be understood that when boiling, steaming, or stewing the food, the receptacle containing same is placed directly upon the grate 4, but the intense heat from the heating element 3 passing directly to the bottom of the pan, if my baffle plate device is not used, would cause burning or, at least, would not satisfactorily brown the top of foods, such as pies, cakes, biscuits, and the like, if contained in the pan directly upon the grate. Therefore, the interposition of a simple and efficient means between the receptacles, containing the food, and the grate, causes even and uniform distribution of the heat in the oven, so that the food will be satisfactorily and evenly cooked and browned at the same time.

It will be understood from the foregoing description that I have shown, in the preferred embodiment, a plurality of disks arranged in pairs (Fig. 3) and that the disks of each pair are provided with integral spacing means, whereas, the pairs of disks are spaced apart by the pair of auxiliary disks 8 interposed at the middle of the device between the two inner primary disks of the pairs.

By the expression "disk" or "disks" in the foregoing, and in the appended claims, I do not necessarily limit myself to a round plate or sheet, as I use the word "disk" in a broad sense to describe a heat deflecting element.

It is to be understood that I have described the preferred embodiment of my invention, and have illustrated the same in the accompanying drawings, but in the extensive manufacture of my device, certain minor changes or alterations may be found desirable and, therefore, I reserve the right to make such changes or alterations as shall fairly fall within the spirit and scope of the appended claims.

What I claim is:

1. In a device of the class described, the combination of a series of disks arranged in pairs, and the disks in each pair provided with projections extending toward each other in engagement, spacing the disks of the pairs apart, means interposed between the inner disks of the pairs and spacing the pairs of disks apart, and means fastening all of the disks in an assembled position.

2. In a device of the class described, the combination of a series of disks arranged in pairs, the disks in each pair provided with integral means spacing the same apart, auxiliary disks provided with spacing means interposed between the pairs of disks, and fastening means extending through the spacing means of all of the disks and securing the same in an assembled position.

3. In a device of the class described, the combination of a plurality of disks, each disk provided with a plurality of inwardly-extending projections, the disks arranged in two outer pairs, the projections in the disks of each pair in engagement, auxiliary disks provided with projections in engagement and positioned between the pairs of disks, all of said projections provided with registering apertures, and detachable fastening means extending through the apertures of the projections and securing the disks together.

In testimony whereof I hereunto affix my signature.

MORTON MURPHY.